UNITED STATES PATENT OFFICE.

GEORG MERLING, OF ELBERFELD, AND HUGO KÖHLER, OF LEVERKUSEN, NEAR COLOGNE, GERMANY, ASSIGNORS TO FARBENFABRIKEN VORM. FRIEDR. BAYER & CO., OF ELBERFELD, GERMANY, A CORPORATION OF GERMANY.

PROCESS OF PRODUCING 1-DIMETHYLAMINO-2-METHYLBUTENE-3.

1,065,159.
No Drawing.

Specification of Letters Patent. Patented June 17, 1913.
Application filed November 7, 1912. Serial No. 730,018.

*To all whom it may concern:*

Be it known that we, GEORG MERLING and HUGO KÖHLER, doctors of philosophy, chemists, citizens of the German Empire, residing, respectively, at Elberfeld and Leverkusen, near Cologne, Germany, have invented new and useful Improvements in Processes of Producing 1-Dimethylamino-2-Methylbutene-3, of which the following is a specification.

The present invention concerns the production of 1-dimethylamino-2-methylbutene-3 (beta-methylisocrotyldimethylamin) having most probably the formula:

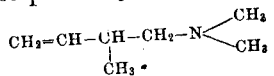

which has proved to be a valuable intermediate product for the manufacture of isoprene. The process for its production consists in heating 2-methyl-3-oxybutyldimethylamin.

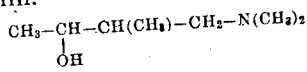

with a dehydrating agent and more specifically with sulfuric acid as dehydrating agent.

In order to illustrate the new process more fully the following example is given, the parts being by weight:—1 part of 2-methyl-3-oxybutyldimethylamin is heated in an autoclave with 5–10 parts of sulfuric acid (50 per cent.) for 10 hours to 150–160° C. After cooling the solution is saturated with caustic soda lye and the unsaturated base is distilled with steam, isolated and after being dried with caustic potash purified by distillation.

The elimination of water from the oxybase proceeds more quickly and more easily on treating the oxybase with concentrated sulfuric acid.

1 part of 2-methyl-3-oxybutyldimethylamin is gradually dropped into 3 parts of concentrated sulfuric acid which has to be cooled and stirred and the colorless solution is heated on a boiling water bath for 3 to 4 hours. The brownish solution is poured on ice, saturated while being cooled with caustic soda lye and worked up in the same manner as before described. The yield of 1-dimethylamino-2-methylbutene-3 is nearly theoretical. 1-dimethylamino-2-methylbutene-3 is a colorless thin liquid, difficultly soluble in water having a penetrating odor resembling coniin and boiling at from 113–116° C.

We claim:—

1. Process for producing 1-dimethylamino-2-methylbutene-3 which comprises dehydrating 2-methyl-3-oxybutyldimethylamin.

2. Process for producing 1-dimethylamino-2-methylbutene-3 which comprises heating 2-methyl-3-oxybutyldimethylamin with a dehydrating agent.

3. Process for producing 1-dimethylamino-2-methylbutene-3 which comprises heating 2-methyl-3-oxybutyldimethylamin with concentrated sulfuric acid.

4. Process for producing 1-dimethylamino-2-methylbutene-3 having most probably the formula:

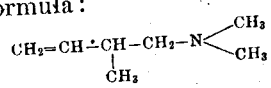

which process consists in first heating 2-methyl-3-oxybutyldimethylamin:

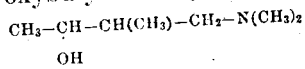

with sulfuric acid and then isolating the resulting base, substantially as described.

5. Process for producing 1-dimethylamino-2-methylbutene-3 having most probably the formula:

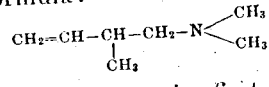

which process consists in first heating 2-methyl-3-oxybutyldimethylamin:

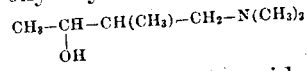

with concentrated sulfuric acid and then isolating the resulting base, substantially as described.

In testimony whereof we have hereunto set our hands in the presence of two subscribing witnesses.

GEORG MERLING. [L. S.]
HUGO KÖHLER. [L. S.]

Witnesses
HELEN NUFER,
ALBERT NUFER.